United States Patent
Allbright

(10) Patent No.: US 10,210,585 B2
(45) Date of Patent: Feb. 19, 2019

(54) SYSTEMS AND METHODS FOR USE IN COMPRESSING DATA STRUCTURES

(71) Applicant: MASTERCARD INTERNATIONAL INCORPORATED, Purchase, NY (US)

(72) Inventor: Josh Allbright, Valley Park, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 452 days.

(21) Appl. No.: 15/013,383

(22) Filed: Feb. 2, 2016

(65) Prior Publication Data
US 2017/0221153 A1     Aug. 3, 2017

(51) Int. Cl.
  *G06F 7/00*      (2006.01)
  *G06F 17/30*     (2006.01)
  *G06Q 40/00*     (2012.01)
  *H03M 7/30*      (2006.01)

(52) U.S. Cl.
  CPC ....... *G06Q 40/12* (2013.12); *G06F 17/30286* (2013.01); *H03M 7/30* (2013.01)

(58) Field of Classification Search
  CPC ......... G06F 17/30463; G06F 17/30528; G06F 17/30545; G06F 17/30286; G06Q 40/12; H03M 7/30
  See application file for complete search history.

(56) References Cited

U.S. PATENT DOCUMENTS

| | | | | |
|---|---|---|---|---|
| 2008/0071748 | A1* | 3/2008 | Wroblewski | G06F 17/30448 |
| 2010/0281079 | A1* | 11/2010 | Marwah | H03M 7/30 |
| | | | | 707/812 |
| 2016/0350371 | A1* | 12/2016 | Das | G06F 17/30463 |

* cited by examiner

*Primary Examiner* — Azam M Cheema
(74) *Attorney, Agent, or Firm* — Harness, Dickey & Pierce, P.L.C.

(57) ABSTRACT

Systems and methods are provided for compressing data structures. One exemplary method includes accessing a target data structure defining multiple columns, and filtering the columns based on a cardinality of terms in each of the columns. The method also includes, for each filtered column, sorting the data structure by the column, compressing the sorted data structure, and identifying the filtered column as a candidate column when the size of the compressed and sorted data structure is less than a baseline size. The method further includes, for each pair of candidate columns, sorting the data structure by the pair of candidate columns, compressing the pair-sorted data structure, and designating the compressed pair-sorted data structure as an object data structure and the pair of candidate columns as a sorting column pair, when said compressed pair-sorted data structure includes a smallest size compared to sizes of other compressed pair-sorted data structures.

20 Claims, 3 Drawing Sheets

SYSTEMS AND METHODS FOR USE IN COMPRESSING DATA STRUCTURES

FIELD

The present disclosure generally relates to systems and methods for use in compressing data structures, and in particular, to sorting the data structures, prior to such compression, in order to reduce compressed sizes of the data structures.

BACKGROUND

This section provides background information related to the present disclosure which is not necessarily prior art.

Consumers typically use payment accounts in transactions to purchase products (e.g., good and services, etc.) from merchants. Transaction data, representative of such transactions, is often collected by payment networks, and others, and organized into one or more data structures for subsequent use (e.g., for completion of the transactions, for use in various services provided by the payment networks or others, etc.). Often, the data structures are compressed, via one or more known compression algorithms, prior to being transmitted to recipients, whereby sizes of the data structures are reduced. Then, upon receipt of the compressed data structures, the recipients are permitted, based on the compression algorithms used, to reconstruct the data structures without loss of data, or with loss of data within one or more acceptable tolerances (where the losses are dependent, at least in part, on the types of data included in the data structures).

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
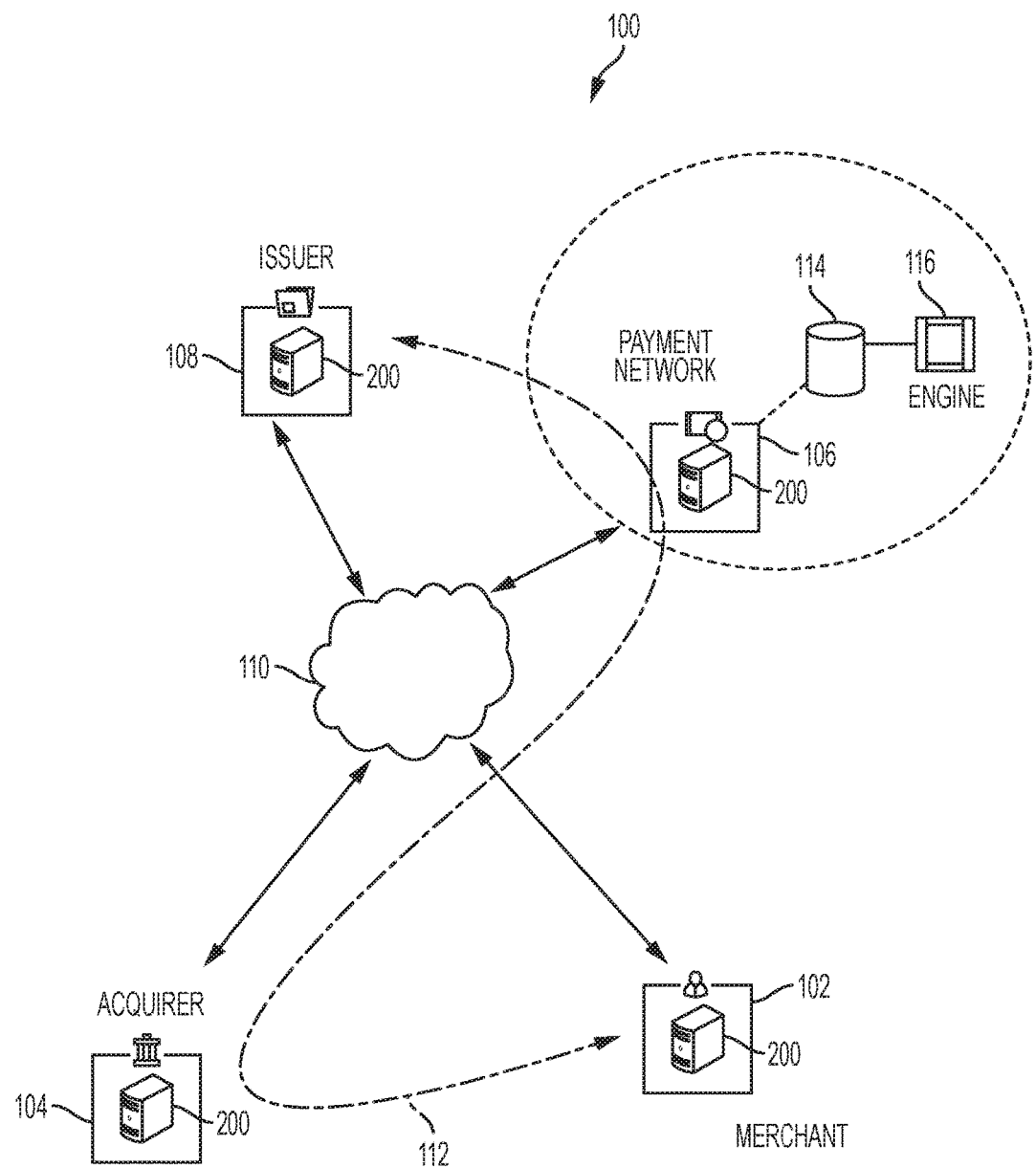
FIG. 1 is a block diagram of an exemplary system of the present disclosure suitable for use in sorting and compressing data structures.

Exemplary embodiments will now be described more fully with reference to the accompanying drawings. The description and specific examples included herein are intended for purposes of illustration only and are not intended to limit the scope of the present disclosure.

Transaction data is often used by acquirers, payment networks, issuers, and/or others to manage and complete purchase transactions between consumers and merchants, and further as part of various services to determine insights into, characteristics of, or predictors associated with the consumers and/or the merchants involved in the purchase transactions. The transaction data is often represented in a data structure, expressed in multiple columns for the different data included therein. For example, clearing data, operated on by a payment network, may be compiled into a data structure having hundreds of columns of data (or more or less), with millions or even tens of millions of entries (or rows) in the data structure. Often, the data structure is compressed, prior to transmittal, for example, from payment networks to issuers and/or acquirers, or others, and vice-versa. Apart from transaction data, various other different types of data may also be included in data structures and expressed in columns.

The systems and methods herein provide for sorting of the data structures, prior to such compression, to further reduce the size of the data structures. In particular, for example, certain columns in the data structures are selected based on the data included therein and sorted one at a time, and then the data structures are compressed. The columns, for which the sorted-compressed data structures are below a threshold, are identified as candidate columns. The candidate columns are then paired, and the data structures are sorted by the paired columns and compressed. A smaller one of the compressed data structures (e.g., the most compressed, the smallest, etc.) is then used in transmission of the data structures between parties (e.g., between payment networks, acquirers, issuers, and/or others when the data structures relate to transaction data; etc.), etc. In this manner, the systems and methods herein uniquely modify the data structures, prior to compression, to enhance the effectiveness of compression algorithm(s) effecting the compression. It should be appreciated that the systems and methods herein can be used in connection with any type of data and/or data structures. And, while the following description of the systems and methods relates to transaction data, such data is merely exemplary (and not limiting) of the systems and methods (i.e., application of the systems and method herein are not limited to transaction data).

In one particular example, a data structure may include clearing data that is organized into 370 columns and has more than a million entries, defining a size on the order of approximately 50 GB. That number of columns yields 136,530 different possible sorted versions of the data structure that can be compressed, where each version is sorted by a different combination of two columns (and where the compressed size of one of the combinations is less than all others). The operations described herein avoid the work of compressing all 136,530 versions of the data structure (to find which sorted version has the smallest compressed size), and instead reduces the number of potential columns upon which the data structure should be sorted prior to compression to seven columns (i.e., resulting in 42 different possible sorted versions of the data structure)—for use in yielding the smallest (or one of the smallest) compressed versions of the data structure. In this manner, identifying the pair of columns upon which the data structure should be sorted permits more efficient identification of the sorted version of the data structure and potentially results in a reduction of the compressed size of the data structure upwards of about 30% (e.g., at least about 15%, at least about 20%, at least about 25%, at least about 30%, etc.) (as compared to the size of the unsorted compressed data structure). Again, it should be appreciated that the systems and methods herein are not limited to transaction data, and may be used with other types of data within the scope of the present disclosure. And, similar improvements in efficiencies, sizes, etc. would also be recognized in connection with the other types of data.

FIG. 1 illustrates an exemplary system 100, in which the one or more aspects of the present disclosure may be implemented. Although the system 100 is presented in one arrangement, other embodiments may include systems arranged otherwise depending, for example, on the particular data involved, processing of such data by parts of the system, use of such data by parts of the system, services offered by parts of the system, etc.

As shown in FIG. 1, the system 100 generally includes a merchant 102, an acquirer 104, a payment network 106, and an issuer 108, each coupled to (and in communication with) network 110. The network 110 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 110 may include multiple different networks, such as a private payment transaction network made accessible by the payment network 106 to the acquirer 104 and the issuer 108 and, separately, the public Internet, which is accessible as desired to the merchant 102, the acquirer 104, etc.

The merchant 102 is generally associated with products (e.g., goods and/or services, etc.) for purchase by one or more consumers, for example, via payment accounts. The merchant 102 may include an online merchant, having a virtual location on the Internet (e.g., a website accessible through the network 110, etc.), or through a web-based application, etc., to permit consumers to initiate transactions for products offered by the merchant 102 for purchase. In addition, or alternatively, the merchant 102 may include at least one brick-and-mortar location.

In connection with a purchase by a consumer at the merchant 102, via a payment account, for example, an authorization request is generated at the merchant 102 and transmitted to the acquirer 104, consistent with path 112 in FIG. 1. The acquirer 104, in turn, as further indicated by path 112, communicates the authorization request to the issuer 108, through the payment network 106, such as, for example, through MasterCard®, VISA®, Discover®, American Express®, etc., to determine (in conjunction with the issuer 108 that provided the payment account to the consumer) whether the payment account is in good standing and whether there is sufficient credit/funds to complete the transaction. If the issuer 108 accepts the transaction, a reply authorizing the transaction is conventionally provided back to the acquirer 104 and the merchant 102, thereby permitting the merchant 102 to complete the transaction. The transaction is later cleared and/or settled by and between the merchant 102 and the acquirer 104 (via an agreement between the merchant 102 and the acquirer 104), and by and between the acquirer 104 and the issuer 108 (via an agreement between the acquirer 104 and the issuer 108), through further communications therebetween. If the issuer 108 declines the transaction for any reasons, a reply declining the transaction is provided back to the merchant 102, thereby permitting the merchant 102 to stop the transaction.

Transaction data is generated, collected, and stored as part of the above example interactions among the merchant 102, the acquirer 104, the payment network 106, the issuer 108, and the consumer. The transaction data represents at least a plurality of transactions, for example, authorized transactions, cleared transactions, attempted transactions, etc. The transaction data, in this exemplary embodiment, is stored at least by the payment network 106 (e.g., in data structure 114, in other data structures associated with the payment network 106, etc.). The transaction data includes, for example, payment instrument identifiers such as payment account numbers, amounts of the transactions, merchant IDs, merchant category codes (MCCs), dates/times of the transactions, products purchased and related descriptions or identifiers, etc. It should be appreciated that more or less information related to transactions, as part of either authorization, clearing, and/or settling, may be included in transaction data and stored within the system 100, at the merchant 102, the acquirer 104, the payment network 106, and/or the issuer 108. Again, while various embodiments are described herein with reference to transaction data, other data, both related and/or unrelated to payment networks, etc., may be subjected to the description herein.

While one merchant 102, one acquirer 104, one payment network 106, and one issuer 108 are illustrated in the system 100 in FIG. 1, it should be appreciated that any number of these entities (and their associated components) may be included in the system 100, or may be included as a part of systems in other embodiments, consistent with the present disclosure.

Figure 2:
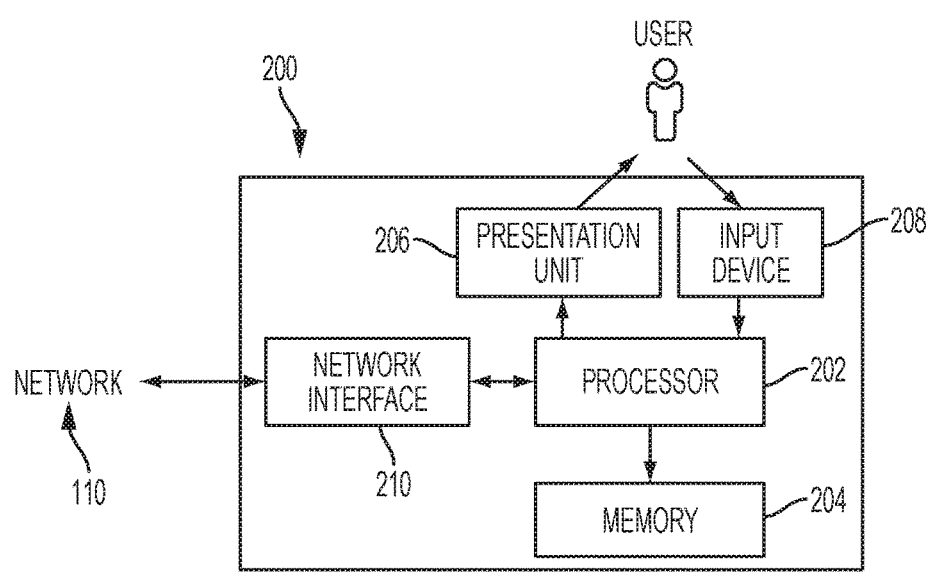
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices.

In the exemplary embodiment of FIG. 1, each of the merchant 102, the acquirer 104, the payment network 106, and the issuer 108 are illustrated as including, or being implemented in or associated with, a computing device 200, coupled to the network 110. Further, the computing devices 200 associated with these parts of the system 100, for example, may include a single computing device, or multiple computing devices located in close proximity or distributed over a geographic region, again so long as the computing devices are specifically configured to function as described herein.

Referring to FIG. 2, the exemplary computing device 200 includes a processor 202 and a memory 204 coupled to (and in communication with) the processor 202. The processor 202 may include one or more processing units (e.g., in a multi-core configuration, etc.) such as, and without limitation, a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, a variety of data structures (including various types of data, including, e.g., transaction data, other data, etc.) in various formats (e.g., in row/column type formats, etc.), encoding and/or compression algorithms, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes a presentation unit 206 that is coupled to (and in communication with) the processor 202 (however, it should be appreciated that the computing device 200 could include output devices other than the presentation unit 206, etc.). The presentation unit 206 outputs information, either visually or audibly to a user of the computing device 200, for example, a user at payment network 106 associated with the operations described herein, etc. It should be further appreciated that various interfaces (e.g., as defined by internet-based applications, webpages, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, selections of target data structures, etc. The input device 208 is coupled to (and in communication with) the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to one or more different networks, including the network 110. Further, in some exemplary embodiments, the computing device 200 includes the processor 202 and one or more network interfaces incorporated into or with the processor 202.

Referring again to FIG. 1, the system 100 includes a reduction engine 116, which is specifically configured, by executable instructions, to perform one or more of the operations herein. As shown in FIG. 1, the reduction engine 116 is illustrated generally as a standalone part of the system 100 but, as indicated by the dotted lines, may be incorporated with or associated with the payment network 106, as desired. Alternatively, in other embodiments, the engine 116 may be incorporated with other parts of the system 100 (e.g., the issuer 108, etc.), or with other parts of other systems depending, for example, on the type of data being processed by the engine 116, etc. In general, in the system 100, when transaction data is at issue, the engine 116 may be implemented and/or located, based on where, in path 112, for example, the transaction data is stored, etc. In addition, the reduction engine 116 may be implemented in the system 100 in a computing device consistent with computing device 200, or in other computing devices within the scope of the present disclosure. In various other embodiments, and as previously indicated, the reduction engine 116 may be employed in systems, which are unrelated to transaction data. In addition, the reduction engine 116 may operation in the system 100 in connection with data unrelated to transaction data.

In the illustrated system 100, the reduction engine 116 is generally configured to access a target data structure (e.g., data structure 114, etc.), and transaction data stored therein, for compression and to identify which columns within the data structure to use as a basis for sorting prior to compression.

In so doing, the reduction engine 116 is configured to initially filter columns in the target data structure based on a predefined threshold, for example, a particular number or a particular percentage of columns included in the data structure, etc., in order to reduce the total number of columns subjected to later operations. As an example, the engine 116 may identify the columns in the data structure with cardinality (i.e., |A| or card (A) of set A) above a predefined threshold (e.g. columns having a cardinality or number of unique entries above 100, etc.).

The reduction engine 116 is also configured to sort the target data structure, by each remaining column (i.e., sort-by columns) after filtering. Then, the engine 116 is configured to compress the resulting filtered and sorted data structure. Any suitable compression techniques (including libraries, formats, algorithms, etc.) may be used to compress the resulting filtered and sorted data structure including, for example, Snappy (previously Zippy), gzip (based on the deflate data compression algorithm), LZO (Lempel-Ziv-Oberhumer; utilizing a lossless data compression algorithm), LZ4, bzip2 (utilizing the Burrows-Wheeler algorithm), or any other suitable technique. In addition, any suitable columnar file storage format may be used including, for example, Parquet (from Apache Software Foundation), RCFile (Record Columnar File), ORCFile (Optimized Row Columnar File from Apache Software Foundation), Exadata HCC (Hybrid Columnar Compression) (from Oracle), or any other suitable file storage format.

In addition, the reduction engine 116 is configured to identify the sort-by columns associated with the compressed data structure that are below a predefined size as candidate columns. In connection therewith, the engine 116 is configured to identify pairs of the candidate columns (i.e., ordered-pairs of the candidate columns), sort the data structure by the column pairs, and further compress the sorted data structure (as an object data structure). The smallest compressed data structure (or one of the smallest), or the most compressed one of the data structures, is determined to be the object data structure, which may be transmitted by and/or between the parts of system 100, as an efficient alternative to transmitting an uncompressed version of the data structure or a compressed version of the un-sorted data structure (e.g., potentially in the range of about 15% to about 30%, or more or less; etc.). The engine 116 is configured to also publish the object data structure to part of the system 100 (e.g., to a user in the system 100, etc.) for transmission, other desired use, etc.

In some embodiments, the engine 116 may maintain additional data structures in order to organize and effect execution of the sort-compress operations. For instance, the engine 116 may maintain one or more data structures (e.g., lists, queues, etc.) to keep track of which columns have been selected and analyzed, or which ordered pairs of columns have been selected and analyzed. These additional data structures may be stored on one or more memories or memory devices (e.g., memory 204, etc.) to which the engine 116 has access. Further, the additional data structures may be multi-dimensional in that they may be used to store data about the sort-compress operations as well as form relationships between various data from the operations.

Figure 3:
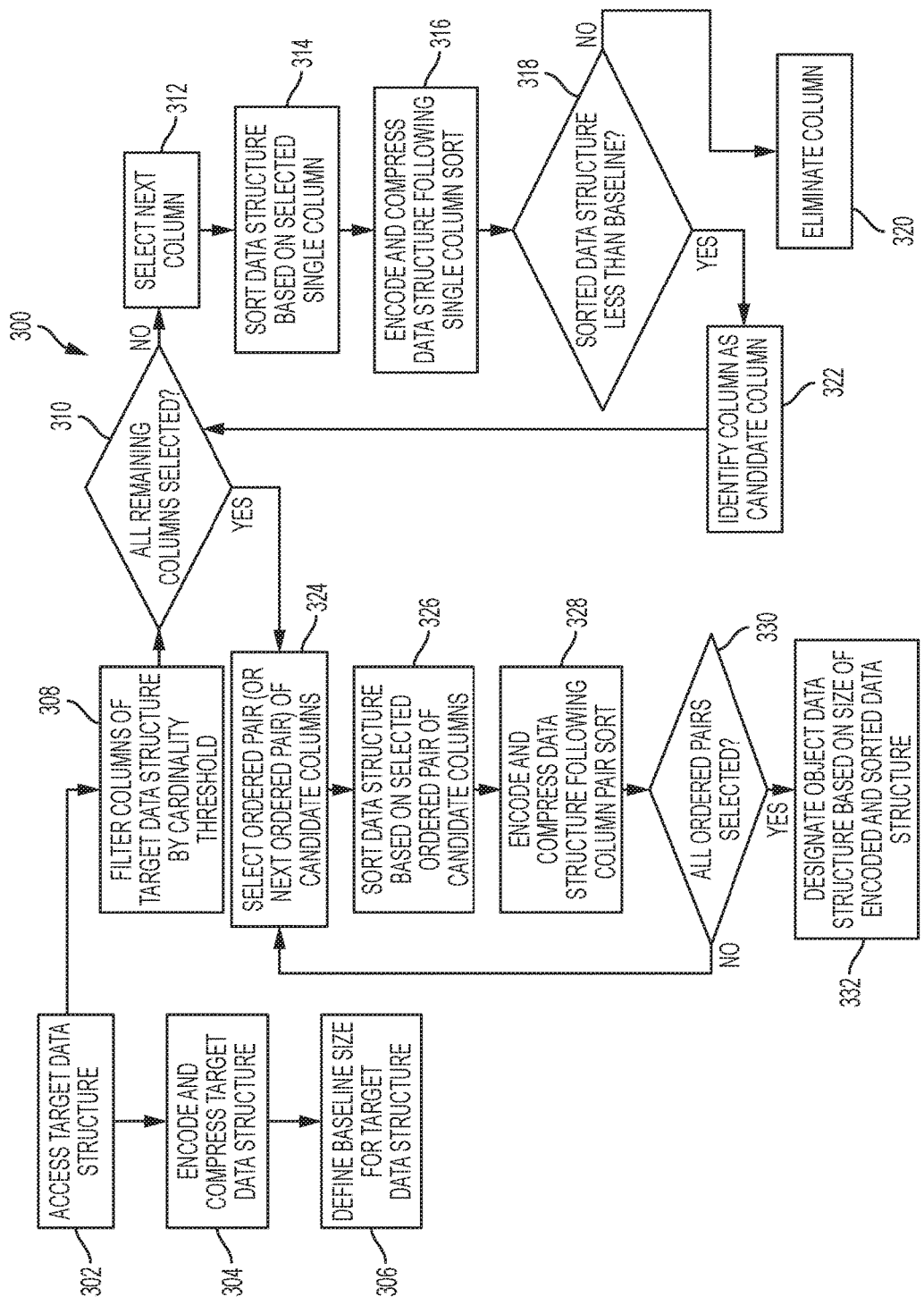
FIG. 3 is an exemplary method that may be implemented in connection with the system of FIG. 1 for compressing data in a data structure.

FIG. 3 illustrates an exemplary method 300 for sorting data structures, prior to compression, to thereby reduce compressed sizes of the data structures. The exemplary method 300 is described as implemented in the reduction engine 116. However, it should be understood that the method 300 is not limited to this configuration of the engine 116, as the method 300 may be implemented in other ones of the computing devices 200 in system 100, or in multiple other computing devices. As such, the methods herein should not be understood to be limited to the exemplary system 100 or the exemplary computing device 200, and likewise, the systems and the computing devices herein should not be understood to be limited to the exemplary method 300. Further, the methods herein should not be understood to be limited to transaction data, and may be applied in connection with any type of data within the scope of the present disclosure.

The method 300 is also described herein, in implementation, with reference to an exemplary clearing data structure, which includes 370 columns and more than 110 million rows of transaction data entries. While the clearing data structure is referenced herein for purposes of providing an example application of the method 300, it should be appreciated that other data structures (related to transaction data or not) may be subject to the methods herein to yield similar or comparable reductions in data structure sizes.

As shown in FIG. 3, at 302 in the method 300, the engine 116 initially accesses a target data structure (e.g., the clearing data structure described above, etc.). The target data structure may generally be stored in a columnar file format (e.g., a Parquet file format, a Hadoop file format, a Hybrid Columnar Compression (HCC) on Exadata file format, etc.) or the like. The files making up the target data structure may be stored on one or more memories and/or memory devices, such as the memory 204 of FIG. 2, described above, for example. In connection therewith, the engine 116 is configured to communicate with the memory and retrieve some or all of the target data structure, as necessary.

After accessing the target data structure, the engine 116 encodes and compresses the target data structure, at 304. This may involve encoding and compressing the entire data structure. Or, this may involve encoding and compressing a subset of the target data structure, for example, where the target data structure is so large that application of the operations herein are impractical. As described above in connection with the system 100, any suitable techniques may be used to encode and compress the target data structure including, for example, Snappy, gzip, LZO, LZ4, bzip2, or any other suitable technique. In addition, any suitable columnar file storage format may be used including, for example, Parquet, RCFile, ORCFile, Exadata HCC (Hybrid Columnar Compression) (from Oracle), or any other suitable file storage format.

The engine 116 then records information about the compressed file and, based thereon, defines a baseline compression/size for the target data structure, at 306. The baseline may include various information about the compressed target data structure such as, for example, a percentage size difference between the original target data structure and the compressed target data structure, time taken to compress target data structure, column order in the original target data structure and/or in the compressed target data structure, etc. The baseline information may also be used, subsequently in the method 300, to determine a degree of improvement when executing various sort-compress operations of the method, as described more hereinafter.

With continued reference to FIG. 3, the engine 116 also filters the columns of the original target data structure, at 308, according to a predefined cardinality threshold. In other embodiments, however, the engine 116 may filter columns in target data structures based on column properties other than cardinality.

The cardinality threshold used by the engine 116 in the illustrated method 300 is predefined in such a way that a plurality of columns with relatively low cardinality are eliminated prior to the rest of the sort-compress operations. The threshold may be defined as a hard-coded value, requiring that filtered columns have a cardinality of at least that value. Alternatively, the engine 116 may eliminate (e.g., in connection with a domain expert, etc.) a certain percentage of columns with the lowest relative cardinality. For instance, the engine 116 (e.g., in connection with a domain expert, etc.) may assign a cardinality threshold of 100, wherein columns in the target data structure containing fewer than 100 unique values would be filtered out of the possible sorting columns. Or, the engine 116 may indicate to filter out 60% of the lowest cardinality columns. As an example, for the exemplary clearing data structure previously described, having 370 columns therein, the engine 116 may indicate to filter out 60% of the lowest cardinality columns. In so doing, 222 columns (i.e., 60% of 370 total columns) of the clearing data structure would be filtered out.

In connection with filtering the columns, at 308, the engine 116 starts with a list of all of the columns of the target data structure stored, for example, in memory 204, as a representation of the potential sorting columns. The list of potential columns may be stored in the order in which the columns appear in the target data structure, or in a different order, such as by order of cardinality, alphabetically by column name, etc. Then, as the engine 116 filters the columns, the columns that do not meet the predefined cardinality threshold are eliminated from the list of potential sorting columns.

As can be appreciated, when a generally large number of columns still remains in the data structure after filtering, at 308, the required time to complete the sort-compress operations herein increases. However, having the generally larger number of columns also provides additional possibilities for later operations of sorting data for compression. Typically, this tradeoff will be considered by domain experts for each target data structure (as each data structure will typically include unique sets of columns and data and require individualized consideration).

Next in the method 300, the engine 116 determines, at 310, if all remaining columns in the target data structure, after filtering, have been selected and subjected to an initial test/comparison. Initially, the engine 116 determines that none of the columns remaining in the data structure have been tested and so, at 312, selects a column from the remaining columns. The engine 116 then uses the selected column to sort the target data structure, at 314, and encode/compress the sorted data structure, at 316. Encoding and compressing the single-column sorted data structure, at 314, may be done in a similar manner to the corresponding operation at 304. And, again, any suitable techniques may be used to encode and compress the single-column sorted target data structure.

At 318, the engine 116 compares the target data structure, as sorted at 314 and compressed at 316 (hereinafter, the sorted data structure), to the baseline, defined at 306. The comparison is at least between the size of the sorted data structure and the size of the baseline (i.e., the size of the compressed data structure without sorting).

If the comparison shows that the size of the sorted data structure is larger than the size of the defined baseline, the engine 116 eliminates the current column, selected at 312, from the list of potential columns, at 320. The elimination may comprise deleting the column identifier from the list of potential columns, or flagging the column as being eliminated. Alternatively, if the size of the sorted data structure is found to be smaller than the defined baseline, the engine 116 identifies the current column, selected at 312, as a candidate column, at 322. The identification may include simply leaving the column in the list of potential columns, or it may include flagging the column as a candidate column, for example, in the list of potential columns.

The engine 116 then again determines, at 310, if all remaining columns in the target data structure, after filtering, have been selected and subjected to an initial test/comparison. If additional columns remain, the engine 116 repeats operations 310-318. After each selected column is analyzed, via the loop 310-318, the original list of potential columns for the target data structure comprises only columns that, when the data structure is sorted by the particular individual columns, and encoded and compressed, result in a smaller compressed data structure than the defined baseline. As indicated above, in various embodiments, a significant percentage of the total initial columns from the target data structure may have been eliminated.

With further reference to FIG. 3, when the engine 116 determines, at 310, that all of the columns of the target data structure in the potential column list have been selected, the engine 116 next selects a pair of candidate columns, at 324, for further analysis. In particular, the engine 116 analyzes each ordered pair combination of candidate columns remaining in the potential column list. Then, at 326, the engine 116 sorts the target data structure according to the selected order pair of columns.

As an example (and also illustrating application of the method 300 to data other than transaction data), Table 1 illustrates a target data structure comprising three columns of data: a name column, column A containing color data, and column B containing mode of transport data. If columns A and B from the target data structure remain as candidate columns, the engine 116 may select and analyze, at 324 and 326, the combination of (A, B) and the combination of (B, A). When the selected ordered pair of columns is (A, B), the engine 116 first sorts the data by column A and then sorts the data by column B. As shown in Table 2, following such sorting for the ordered pair of columns (A, B), the rows are in a different order from Table 1, and all of the "Blue" rows, "Red" rows, and "Yellow" rows are grouped together. Additionally, the modes of transport for each color group are ordered alphabetically within the color group. Alternatively, when the selected order pair of columns is (B, A), the engine 116 first sorts the data by column B and then sorts the data by column A. As shown in Table 3, following such sorting for the ordered pair of columns (B, A), the rows are again in a different order than Tables 1 or 2, and the "Bus" rows, "Car" rows, and "Train" rows are all grouped together.

Further, within each of the mode of transport groupings, the colors are sorted alphabetically.

TABLE 1

| Name | A | B |
|------|------|------|
| Aaron | Blue | Car |
| Brian | Red | Car |
| Carol | Yellow | Bus |
| Dan | Red | Train |
| Elle | Blue | Bus |
| Frank | Yellow | Train |
| Gina | Yellow | Car |
| Harold | Red | Car |
| Ian | Blue | Train |
| Joan | Yellow | Car |
| Karen | Red | Bus |
| Linda | Yellow | Bus |
| Matt | Blue | Train |

TABLE 2

| Name | A | B |
|------|------|------|
| Elle | Blue | Bus |
| Aaron | Blue | Car |
| Ian | Blue | Train |
| Matt | Blue | Train |
| Karen | Red | Bus |
| Brian | Red | Car |
| Harold | Red | Car |
| Dan | Red | Train |
| Carol | Yellow | Bus |
| Linda | Yellow | Bus |
| Gina | Yellow | Car |
| Joan | Yellow | Car |
| Frank | Yellow | Train |

TABLE 3

| Name | A | B |
|------|------|------|
| Elle | Blue | Bus |
| Karen | Red | Bus |
| Carol | Yellow | Bus |
| Linda | Yellow | Bus |
| Aaron | Blue | Car |
| Brian | Red | Car |
| Harold | Red | Car |
| Gina | Yellow | Car |
| Joan | Yellow | Car |
| Ian | Blue | Train |
| Matt | Blue | Train |
| Dan | Red | Train |
| Frank | Yellow | Train |

With further reference to FIG. 3, once the target data structure is sorted according to the selected ordered pair of columns, the engine 116 encodes and compresses the resulting sorted data structure, at 328. Encoding and compressing the data structure may again be done in a similar manner to the corresponding operation at 304. And, any suitable techniques may be used to encode and compress the data structure. The engine 116 then saves result information pertaining to the compressed data structure including, for example, at least the resulting size of the compressed data structure. The information may be saved in a separate data structure in memory 204, for example, which associates the size of the compressed data structure with the ordered pair of columns which were used to generate the associated sorted data structure. For example, different selected ordered pairs of columns may result in different sizes of resulting compressed data structures because, at least in part, the encodings used in the columnar storage remove at least some duplicate data from the data structures. More specifically, for example, the assimilation of at least some duplicate data at the column level, resulting from the sorting operations, may be reduced by the encoding operation at 328 (however, such reduction is not the same for the different resulting compressed data structures, thus resulting in different sizes of resulting data structures).

At 330, the engine 116 determines if all ordered pairs of candidate columns have been selected, at 324, and evaluated at 326 and 328. The engine 116 may track the selected ordered pairs by maintaining a list or similar data structure in memory 204 comprising all of the possible ordered pairs of candidate columns remaining in the column list for the data structure, and removing ordered pairs from the list as they are selected. Alternatively, the ordered pairs on the list may be flagged on the list as they are selected and evaluated. Or, the engine 116 may access the data structure storing the ordered pairs in association with the result information described above and check if there are ordered pairs in the list that do not yet have result information associated therewith. In any case, when the engine 116 determines that one or more ordered pairs have not been selected, it selects the next remaining ordered pair, at 324, and repeats operations 326-330.

Alternatively, when the engine 116 determines that all of the ordered pairs have been selected and analyzed, the engine 116 proceeds to designating an object data structure, at 332. The engine 116 designates the object data structure, or object data file, by determining, from the gathered ordered pair information, the ordered pair that is likely to yield the smallest compressed data structure from the total data set. In so doing, the engine 116 compares the saved size information for each of the ordered pairs analyzed at 324-330, and determines which ordered pair resulted in a compressed data structure having the smallest size. The resulting ordered pair is then used as the sorting column pair (i.e., the designated sorting column pair) for the object data structure. As a result, the object data structure comprises at least the designated sorting column pair, and may also comprise information about the encoding and compression techniques used. The object data structure may then be applied to a larger total data structure on which it would be impractical to apply the described method directly.

In view of the above, the systems and methods herein may permit formation of more compressed (e.g., smaller in size, etc.) data files for both transfer and storage, as compared to a straight compression of the same data files. Sorting of the data files by certain columns of a data set, prior to executing encoding and compression techniques, may result in identification of sorted (and compressed) data files having reduced file sizes, for example, of upwards of about 20% or 30%, as compared to straight compressed versions of the original data files. In this manner, the systems and methods herein uniquely modify the data files, prior to compression, to enhance the effectiveness of compression algorithm(s) effecting the compression. As a result, file sizes of the compressed data files can be substantially reduced.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) accessing a target data structure defining multiple columns; (b) filtering columns of the target data structure based on a cardinality of terms in each of the multiple columns; (c) for each filtered column: (i) sorting the target data structure by said filtered column; (ii) compressing the sorted data structure; and (iii) identifying said filtered column as a candidate column, when a size of the compressed and sorted data structure is less than a baseline size; (d) grouping each candidate column into at least one pair with another candidate column; (e) for each pair of the candidate columns: (i) sorting the target data structure by said pair of candidate columns into a pair-sorted data structure; and (ii) compressing the pair-sorted data structure; and (f) designating one of the compressed pair-sorted data structure as an object data structure and the pair of candidate columns as a sorting column pair of the object data structure, when said one of the compressed pair-sorted data structure includes a smaller size as compared to size(s) of ones of the compressed pair-sorted data structures based on each other pair of candidate columns.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in compressing a target data structure including transaction data associated with multiple transactions, the method comprising:
   accessing a target data structure, the target data structure defining multiple columns;
   filtering, by at least one computing device, columns of the target data structure based on a cardinality of terms in each of the multiple columns;
   for each filtered column:
      sorting, by the at least one computing device, the target data structure by said filtered column;
      compressing the sorted data structure; and
      identifying, by the at least one computing device, said filtered column as a candidate column, when a size of the compressed and sorted data structure is less than a baseline size;
   grouping, by the at least one computing device, each candidate column into at least one pair with another candidate column;
   for each pair of candidate columns:
      sorting, by the at least one computing device, the target data structure by said pair of candidate columns into a pair-sorted data structure; and
      compressing the pair-sorted data structure; and
   designating, by the at least one computing device, one of the compressed pair-sorted data structure as an object data structure and the pair of candidate columns as a sorting column pair of the object data structure, when said one of the compressed pair-sorted data structure includes a smaller size as compared to size(s) of ones of the compressed pair-sorted data structures based on other pair of candidate columns.

2. The computer-implemented method of claim 1, wherein filtering the target data structure based on the cardinality of terms in each of the multiple columns includes filtering out one or more columns that include a cardinality less than a threshold; and
   wherein designating the one of the compressed pair-sorted data structure as an object data structure includes designating the one of the compressed pair-sorted data structure as the object data structure, when said one of the compressed pair-sorted data structure includes the smallest size compared to sizes of the compressed pair-sorted data structures based on each other pair of candidate columns.

3. The computer-implemented method of claim 1, wherein each pair of candidate columns includes an ordered pair of candidate columns; and
   wherein sorting the data structure by said pair of candidate columns includes sorting the data structure by said ordered pair of candidate columns.

4. The computer-implemented method of claim 1, further comprising outputting, by the at least one computing device, the object data structure to one of a user and/or another computing device in communication with the at least one computing device.

5. The computer-implemented method of claim 4, wherein the at least one computing device is associated with a payment network; and
   wherein outputting the object data structures includes transmitting the object data structure, in lieu of the target data structure, to an issuer associated with the payment network.

6. The computer-implemented method of claim 1, wherein the target data structure comprises a subset of data of a total data structure.

7. The computer-implemented method of claim 6, further comprising sorting the total data structure using the sorting column pair of the object data structure; and
   compressing the sorted total data structure.

8. The computer-implemented method of claim 1, further comprising compressing the target data structure, the compressed target data structure defining said baseline size for the target data structure.

9. A system for use in compressing a target data structure, the target data structure defining multiple columns, the system comprising:
   at least one processor;
   a memory in communication with the at least one processor, said memory comprising processor-executable instructions that, when executed, cause the at least one processor to:
   access a target data structure having multiple columns;
   filter columns of the target data structure based on a cardinality of terms in each of the multiple columns;
   for each filtered column:
      sort the target data structure by said filtered column;
      compress the sorted data structure; and
      identify said filtered column as a candidate column, when a size of the compressed and sorted data structure is less than a baseline size;
   for each pair of candidate columns:
      sort the target data structure by said pair of candidate columns into a pair-sorted data structure;
      compress the pair-sorted data structure; and
      designate the compressed pair-sorted data structure as an object data structure and the pair of candidate columns as a sorting column pair of the object data structure, when said compressed pair-sorted data structure includes the smallest size compared to sizes of compressed pair-sorted data structures based on each other pair of candidate columns.

10. The system of claim 9, wherein the processor-executable instructions, when executed, further cause the at least one processor to, in connection with filtering the target data structure, filter out one or more columns that include a cardinality less than a predefined threshold.

11. The system of claim 9, wherein each pair of candidate columns includes an ordered pair of candidate columns; and
wherein the processor-executable instructions, when executed, further cause the at least one processor to, in connection with sorting the data structure by said pair of candidate columns, sort the data structure by said ordered pair of candidate columns.

12. The system of claim 9, wherein the processor-executable instructions, when executed, further cause the at least one processor to output the object data structure to one of a user and a computing device in communication with the at least one processor.

13. The system of claim 12, wherein the at least one processor is associated with a payment network; and
wherein the processor-executable instructions, when executed, further cause the at least one processor to, in connection with outputting the object data structure, transmit the object data structure, in lieu of the target data structure, to an issuer associated with the payment network.

14. The system of claim 9, wherein the target data structure comprises a subset of data of a total data structure.

15. The system of claim 14, wherein the processor-executable instructions, when executed, further cause the at least one processor to:
sort the total data structure using the sorting column pair of the object data structure; and
compress the sorted total data structure.

16. The system of claim 9, wherein the processor-executable instructions, when executed, further cause the at least one processor to compress the target data structure, the compressed target data structure defining said baseline size for the target data structure.

17. A non-transitory computer readable storage media including executable instructions for compressing data structures comprising columns, which when executed by at least one processor, cause the at least one processor to:
access an initial data structure from a memory device;
designate a target data structure, wherein the target data structure includes at least a subset of the initial data structure;
filter columns of the target data structure, based on a column property, into a set of filtered columns;
for each column in the set of filtered columns:
sort the target data structure by the column into a column sorted data structure;
compress the column sorted data structure into a compressed sorted data structure;
add the column to a set of candidate columns, when a size of the compressed sorted data structure is smaller than a baseline size;
form multiple column pair combinations, each including one column in the set of candidate columns paired with another column in the set of candidate columns;
for each column pair combination:
sort the target data structure by each column of the column pair combination into a column-pair sorted data structure;
compress the column-pair sorted data structure into a compressed pair-sorted data structure;
record a size of the compressed pair-sorted data structure; and
designate the column pair combination as a sorting column pair when the recorded size of the compressed pair-sorted data structure is smaller than recorded size(s) of one or more of the other compressed pair-sorted data structures;
sort the initial data structure by the designated sorting column pair into a sorted initial data structure; and
compress, and store in memory, the sorted initial data structure into an object data structure, thereby reducing the size of the initial data structure.

18. The non-transitory computer readable storage media of claim 17, wherein the column property comprises cardinality; and
wherein the executable instructions, when executed by the at least one processor in connection with filtering columns of the target data structure, further cause the at least one processor to filter out columns that include a cardinality of less than a predefined threshold.

19. The non-transitory computer readable storage media of claim 17, wherein the executable instructions, when executed by the at least one processor, further cause the at least one processor to output the object data structure to one of a user and a computing device.

20. The non-transitory computer readable storage media of claim 19, wherein the non-transitory computer readable storage media is associated with a payment network; and
wherein the executable instructions, when executed by the at least one processor in connection with outputting the object data structure, further cause the at least one processor to transmit the object data structure, in lieu of the initial data structure, to an issuer associated with the payment network.

* * * * *